(12) United States Patent
Buhrman

(10) Patent No.: US 7,841,354 B1
(45) Date of Patent: Nov. 30, 2010

(54) REMOVABLE CANOPY FOR A TRICYCLE

(76) Inventor: Gary Buhrman, 11401 Rue DeGascony Ct., Ballwin, MO (US) 63011

( * ) Notice: Subject to any disclaimer, the term of this patent is extended or adjusted under 35 U.S.C. 154(b) by 0 days.

(21) Appl. No.: 12/565,361

(22) Filed: Sep. 23, 2009

(51) Int. Cl.
*E04H 15/06* (2006.01)
*B62K 5/00* (2006.01)

(52) U.S. Cl. .................. 135/88.03; 135/96; 135/117

(58) Field of Classification Search ... 135/88.01–88.03, 135/88.06, 88.13, 96, 117, 155, 912; 297/184.1, 297/184.11, 184.13; 280/62, 282, 204, 47.11, 280/288.4
See application file for complete search history.

(56) References Cited

U.S. PATENT DOCUMENTS

| | | | | |
|---|---|---|---|---|
| 4,072,345 A | * | 2/1978 | Matsuda | ................. 297/184.15 |
| D252,456 S | | 7/1979 | Phillips | |
| 4,325,448 A | * | 4/1982 | Pivar | .......................... 180/215 |
| 4,346,725 A | | 8/1982 | Shaw | |
| 5,168,889 A | * | 12/1992 | Diestel | .................... 135/88.01 |
| 5,205,308 A | * | 4/1993 | Kendall et al. | ................. 135/90 |
| 5,277,213 A | * | 1/1994 | Mitchell | ................... 135/88.02 |
| 5,669,624 A | * | 9/1997 | Eichhorn | .................... 280/642 |
| 6,374,775 B1 | * | 4/2002 | Baumsteiger | ............... 119/496 |
| 6,402,166 B1 | * | 6/2002 | Chiu | ....................... 280/47.38 |
| D555,045 S | | 11/2007 | On | |

* cited by examiner

*Primary Examiner*—Winnie Yip
(74) *Attorney, Agent, or Firm*—Polster, Lieder, Woodruff & Lucchesi, L.C.

(57) ABSTRACT

A canopy is provided for a tricycle which can be easily assembled and mounted on a tricycle and removed from the tricycle. The canopy comprise a lower transverse member which is mounted on the shoulder or back tube members of the tricycle; a pair of side members which are mounted on the lower transverse member; an upper transverse member which is mounted on the side members, and a roof member which is mounted on the side members and held in place by the upper transverse member. As will be described below, the components of the canopy engage each other to form a sturdy canopy in which the components will not move relative to each other and in which the canopy will not move relative to the tricycle. Further, the canopy can be assembled and disassembled without the use of tools.

17 Claims, 7 Drawing Sheets

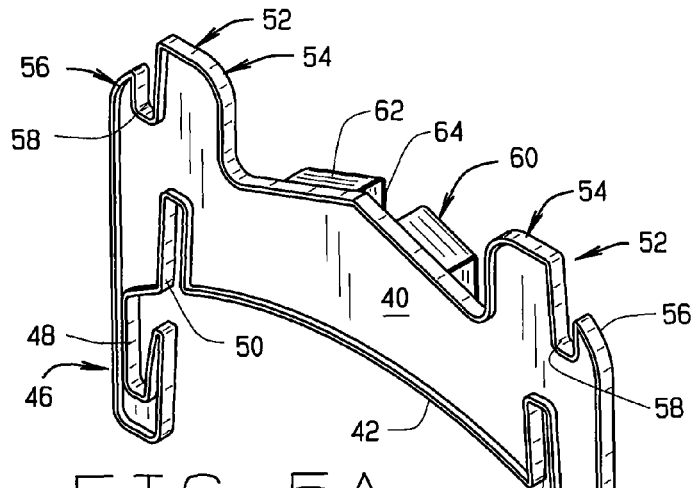
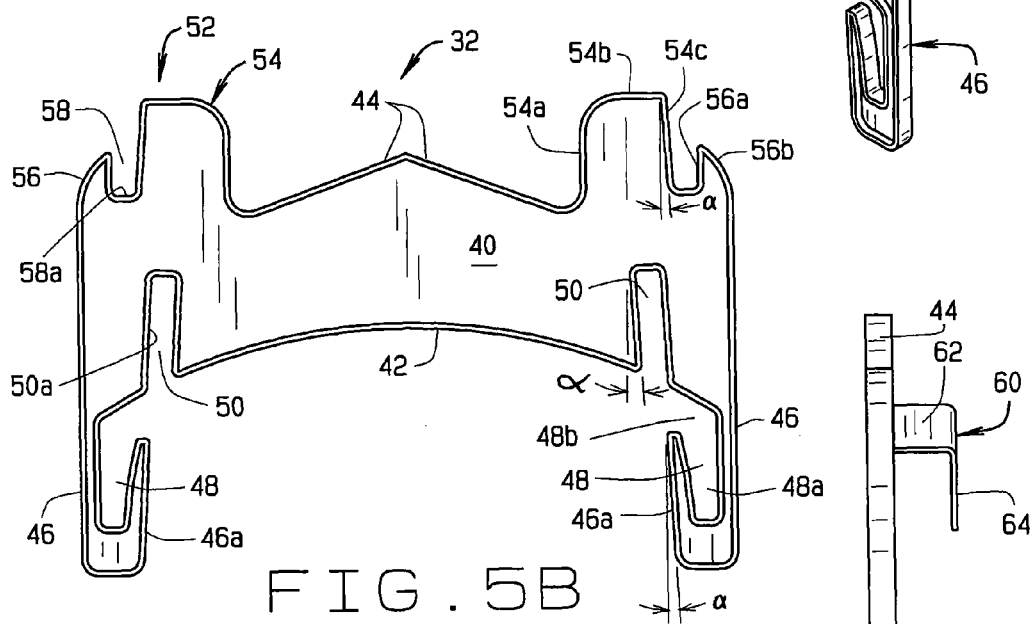
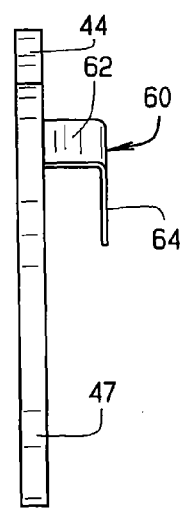
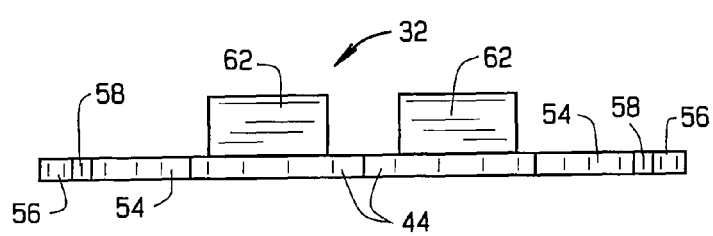
FIG. 5A
FIG. 5B
FIG. 5C
FIG. 5D

REMOVABLE CANOPY FOR A TRICYCLE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to children's tricycles and, in particular, to a canopy or cover for children's tricycles which can be easily mounted on, and removed from, children's tricycles.

Tricycles are typically a child's first "bike", and are often purchased by preschools for use by their students. Oftentimes, there is a desire to provide a canopy for tricycles, either to shield the child from the sun, or to provide decoration for the tricycle. There are few, if any, canopies commercially available for tricycles. It would be desirable to provide such a canopy which can be easily mounted to, and removed from, tricycles, especially without the use of tools.

BRIEF SUMMARY OF THE DISCLOSURE

Briefly stated, a canopy is provided for a tricycle which can be easily assembled and mounted on, and removed from, a tricycle. The canopy comprises a lower transverse member which is mounted on the shoulder or back tube members of the tricycle, a pair of side members which are mounted on the lower transverse member, an upper transverse member which is mounted on the side members, and a roof member which is mounted on the side members and held in place by the upper transverse member. As will be described below, the components of the canopy engage each other to form a sturdy canopy in which the components will not move relative to each other and in which the canopy will not move relative to the tricycle. Further, the canopy can be assembled and disassembled without the use of tools.

The lower transverse member comprises a body having a forward surface, a rear surface, an upper edge, a lower edge and side edges. The body defines a vertical central axis. An attachment device (such as a bracket) extends forwardly from the body forward surface to mount the lower transverse member to a shoulder of a tricycle. A pair of spaced apart upwardly opening slots extend generally downwardly from the upper edge. The slots are spaced apart generally equidistantly from the central axis of the body.

The upper transverse member comprises a body having a forward surface, a rear surface, an upper edge, a lower edge, and side edges. A pair of spaced apart downwardly opening slots extend upwardly from the lower edge and a pair of legs extend downwardly from the upper transverse member body. The legs having an inner edge which is generally co-linear with an outer edge of the upwardly extending slots.

The upper and lower transverse members can be identical. In this case, the upper transverse member will include the elements it lacks from the lower transverse member, and the lower transverse member will include the elements it lacks from the upper transverse member.

The side members each comprise a body having an inner surface, an outer surface, a front edge, a back edge and a top edge. An arm extends upwardly from the side member top edge. The side members are sized to be received in the upwardly opening slots of the lower transverse member and the downwardly extending slots of the upper transverse member. The downwardly extending legs of the upper transverse member are positioned such that the inner edge of the legs engage the outer surfaces of the side members when the canopy is assembled.

The roof member is mounted on the side members to extend forwardly of the side members. The roof member has a back edge, a front edge, side edges and a pair of openings proximate the back and side edges. The openings are sized to receive the upwardly extending arms of the side members and are positioned to be generally aligned with the upwardly extending arms of the side members when the side members are mounted in the lower transverse member.

In accordance with one aspect of the canopy, the upwardly opening slots of the lower transverse member; the downwardly opening slots of the upper transverse member and the inner edge of the legs of the upper transverse member all are sloped inwardly, such that when the canopy is assembled, the side members will slope or cant inwardly to create a frictional engagement of the side members with the inner edge of the legs of the upper transverse member, at least one edge of the upwardly opening slot of the lower transverse member and at least one edge of the downwardly opening slot of the upper transverse member. Preferably, the slope of the upwardly opening slots of the lower transverse member, the downwardly opening slots of the upper transverse member and the inner edge of the legs of the upper transverse member are all substantially the same. The slope can, for example, be about 5°. However, the slope can be greater or smaller, as may be desired. In an illustrative embodiment, the upwardly opening slots of the lower transverse member are each defined by an inner edge and an outer edge, and the inner edge can be longer than the outer edge.

In accordance with another aspect of the invention, the canopy includes a means to prevent the side members from moving relative to the transverse members. In an illustrative embodiment, this means comprises upper and lower slots in the side members. The lower slots are sized to receive the lower transverse member and the upper slots are sized to receive the upper transverse member. In fact, the upper slots of the side members mate with the downwardly opening slots of the upper transverse member; and the lower slots of the side members mate with the upwardly opening slots of the lower transverse member. Other means could be provided in lieu of the slots in the side members. For example, a pin or shaft could extend through the side members and into the transverse members.

In accordance with another aspect of the canopy, the upper transverse member effectively locks or holds the roof member in place on the side members. The side members each include a generally horizontally extending slot in the side member arms which receives that roof member. The slots are sized, and the openings in the roof member are spaced, such that, when the roof member is received on the side members in the arm slots, the back edge of the roof member does not extend over the upper slots in the side members. Further, the upper transverse member body is sized and shaped such that at least a portion of the upper edge is at least level with the slots of the arms of the side members when the upper transverse member is mounted in the side members. Thus, when the canopy is assembled, the roof member is effectively sandwiched between the upper transverse member and the arms of the side members.

In accordance with a further aspect of the canopy, the lower transverse member includes a downwardly extending leg and the side members each include a downwardly extending leg.

The side member legs are adjacent the lower transverse member legs in the canopy when assembled. The canopy further includes a connector to positively connect the lower transverse member legs to the side member legs. In a preferred embodiment, the connector comprises a threaded shaft which extends through the transverse member leg and into the side member leg. Illustratively, the lower transverse member leg includes a slot through which the threaded shaft extends. The threaded shaft has a head at an end of the shaft; whereby, when the shaft is tightened, the lower transverse member leg is sandwiched between the shaft head and the side member leg.

BRIEF DESCRIPTION OF THE SEVERAL VIEWS OF THE DRAWINGS

FIGS. 5a-d are perspective, front elevational, side elevational and top plan views of a transverse member of the tricycle canopy, the canopy using two such transverse members in the canopy;

Corresponding reference numerals will be used throughout the several figures of the drawings.

DETAILED DESCRIPTION

Figure 1:
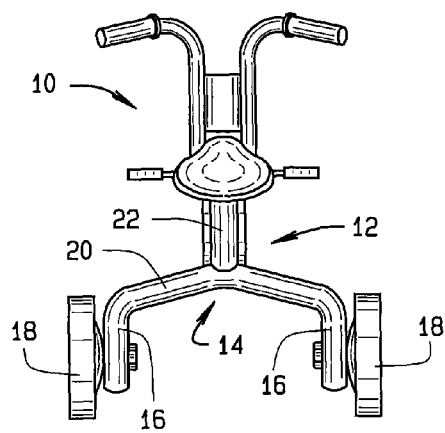
FIG. 1 is a rear perspective view of a typical tricycle.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Referring initially to FIG. 1, a typical tricycle 10 includes a frame 12. In the tricycle shown, the frame 12 includes a generally U-shaped back portion 14 having generally vertical legs 16 at the outer ends of the back portion. The rear wheels 18 are then rotatably mounted to these vertical legs 16 of the frame. Upwardly slanting shoulders 20 extend inwardly from the upper end of the vertical legs 16, and a seat post 22 extends upwardly and forwardly from the point where the two shoulders 22 join. The slope of the shoulders 22 of the tricycle 1 is a fairly shallow slope. In some tricycles, the slope is steeper.

Figure 2:
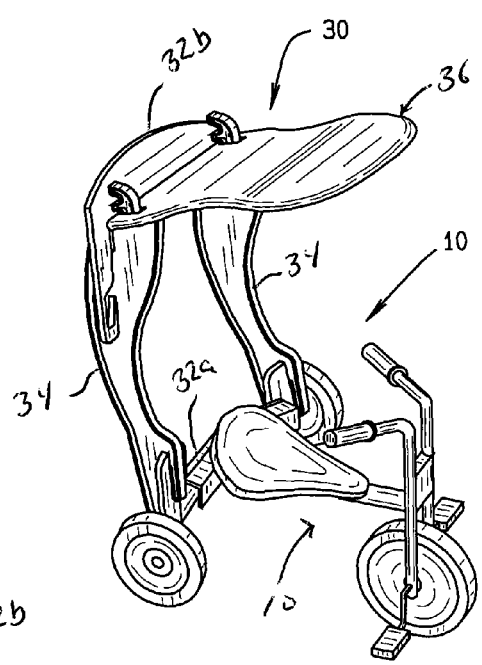
FIG. 2 is a side perspective view of the tricycle with an illustrative embodiment of a canopy mounted on the tricycle.
Figure 3:
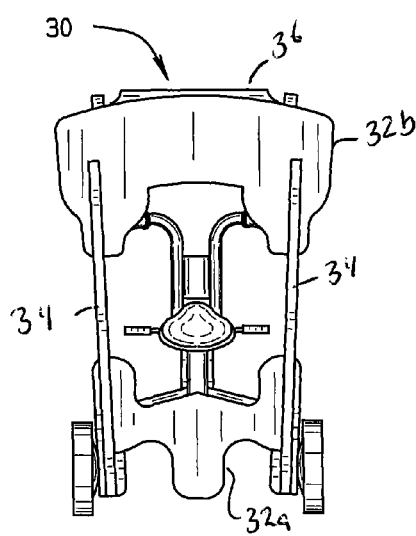
FIG. 3 is a rear view of the tricycle with the canopy.

Turning to FIGS. 2 and 3, a canopy 30 is shown positioned on the tricycle 10, and in FIGS. 4a-d, a preferred embodiment of the canopy 30 is shown in an assembled state, but not on a tricycle. It is the embodiment of FIGS. 4a-d that will be described below. The canopy 30 can be used with different tricycles presenting a wide variety of shoulder slopes.

The canopy 30 is comprised of lower and upper transverse members 32a,b, two side members 34 and a roof member 36. The upper and lower transverse members 32a,b are preferably identical, and hence, only one of the transverse members will be described in detail. Similarly, the two side members are identical to each other. Briefly, the lower transverse member 32a is mounted on the shoulder of the tricycle frame; and the side members 34 are them mounted to opposite sides of the lower transverse member. The roof member 36 is mounted on the side members 34, and the upper transverse member 32b is then placed on the top of the side members to secure the roof member in place and to effectively lock the components of the canopy together. As will become apparent from the description below, the elements of the canopy 30 interact with each other to present a sturdy canopy which is fixed relative to the tricycle and cannot move substantially with respect to the tricycle. That is, the canopy elements will not significantly sway or move relative to each other when the canopy is mounted on the tricycle.

The transverse member 32 is shown in more detail in FIGS. 5a-d. As best seen in FIG. 5b, the transverse member 32 is preferably symmetrical about a vertical axis. As used herein, "inner" will refer to directions toward the vertical axis and "outer" will refer to a direction away from the vertical axis. The transverse member 32 comprises a plate or body 40 having a lower edge 42 and an upper edge 44. The lower edge 42 is generally arcuate, while the upper edge 44 is generally triangular or peaked, the peak being in the approximate center edge 44.

Figure 4A:
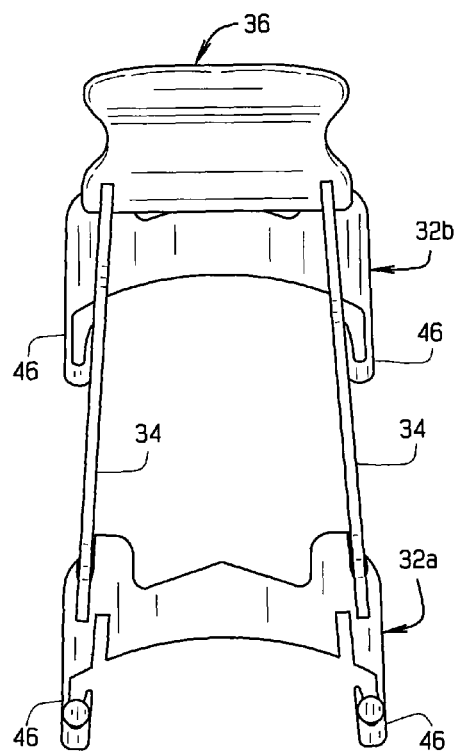
FIGS. 4a-d are front elevational, side elevational, rear elevational and perspective views of a preferred embodiment of the canopy in an assembled state.
Figure 4B:
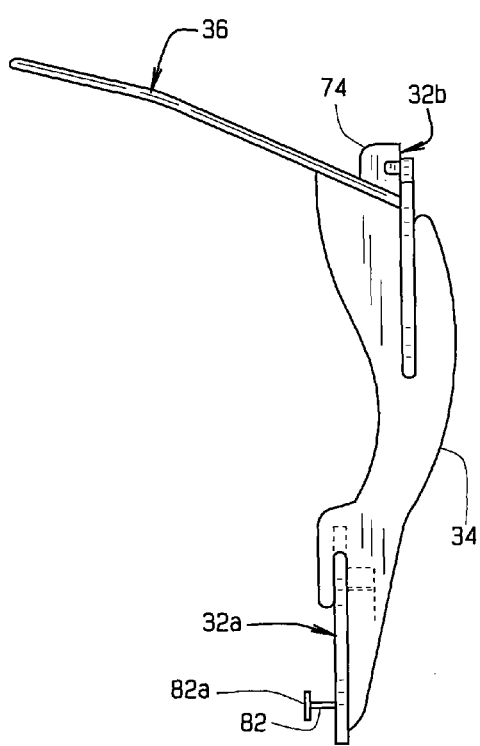
Figure 4C:
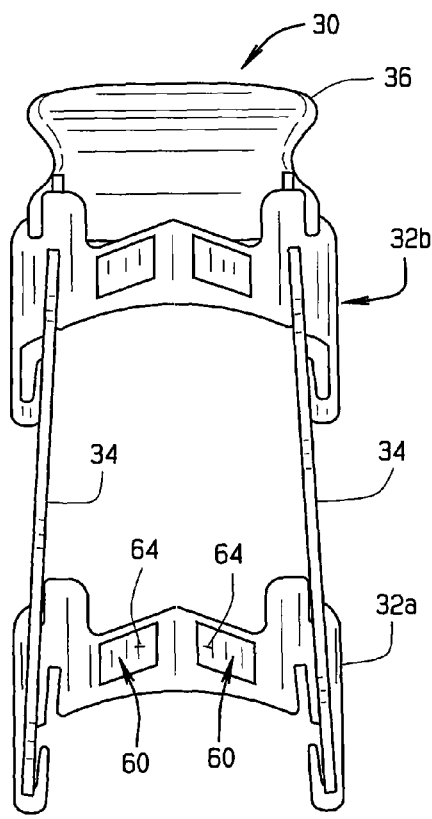

Legs 46 extend downwardly from the lower edge 42 at opposite ends of the lower ledge 42 and are generally perpendicular to the lower edge 42. The legs have an outer edge 47 that is generally vertical when the transverse member 32 is incorporated into the canopy 30, as seen in FIG. 4A. An L-shaped slot 48 is formed in each leg 46. The slot 48 includes a generally vertical portion 48a which extends longitudinally of the leg and a generally horizontal or transverse portion 48b at the upper end of the vertical portion 48a. The upper edge of the transverse portion of the slot 48 is defined by the lower edge 42, and the slot portion 48b opens inwardly, so that the slot portions of the two legs 46 face each other. The generally L-shaped slot 48 thus gives the legs 46 a generally J-shaped or hook-shaped appearance. An additional pair of downwardly opening slots 50 extend from the lower edge 42 toward the upper edge 44. The slots 50 have an outer edge 50a that is generally flush, even or co-linear with an inner edge 46a of the leg 46.

A projection 52 extends from the body 40 at the opposite ends of the upper edge 44. The projection 52 comprises an inner tooth 54 and an outer tooth 56 which are spaced apart to define a slot 58. The inner tooth 54 is defined by a generally vertical inner edge 54a, a generally horizontal edge 52b, and a generally vertical outer edge 52c. The junction between the inner edge 54a and the horizontal edge 54b is curved. The outer tooth 56 is defined by an inner edge 54a and a curving outer edge 54b. As best seen in FIG. 5b, the inner tooth is taller than the outer tooth and thus the edge 54c is taller than the edge 56a. The slot 58 is thus defined by the inner tooth outer edge 54c, the outer tooth inner edge 56a, and a horizontal floor (or ceiling) 58a.

Lastly, the transverse member 32 comprises a pair of L-shaped brackets 60 extending from the back surface of the body 40. The brackets 60 comprise a rearwardly extending surface which is normal to the body 40 and an elongate vertical leg 64. The surface 62 is sloped or angled, and as seen in FIG. 5a, is generally parallel to the edge 44. The width of the brackets 60 are sized to receive the tube defining the shoulder 20 of the tricycle, and the brackets are positioned on the transverse member 32 to engage the tricycle shoulder. Between the seat post 22 and the vertical tube 16 to which the wheels 18 are secured. Additionally, the slope of the bracket corresponds generally to the slope of the shoulder 20. The correspondence between the bracket angle and the shoulder 20 need not be exact. All that is necessary is that the bracket be able to rest on the shoulder with at least a point contact on the shoulder, such that the shoulder 20 will support the canopy 30. Because the brackets are sloped, a contact with the shoulder at least one point along the length of the bracket is virtually guaranteed, as long as the slope of the shoulder is not steeper than the slope of the bracket. Thus, the use of the brackets 60 will allow the transverse member to be mounted on many different styles of tricycle shoulders. Although brackets are provided to mount the transverse member to the tricycle shoulder 20, other mounting means could be used.

The side members 34 are shown in more detail in FIGS. 6a-d. The side members 34 comprise a body 70 having a rear edge 70a, a front edge 70b and a top edge 70c. The rear and front edges are shown to be curved, with the rear edge 70a being generally convex and the front edge 70b being generally concave. However, the side member body could be given virtually any desired shape. The top edge 70c is slanted, with the back end of the top edge being spaced vertically above the rear end of the top edge 70c. A rear slot 72 extends downwardly from the top edge 70c spaced forwardly slightly from the rear of the top edge. An arm 74 extends upwardly from the top edge forward of the slot 72. Two fingers 76 extend rearwardly from the arm 74 to define an upper slot 78a between the two fingers 76 and a lower slot 78b between the lower finger 76 and the body top edge 70c. A leg 80 extends downwardly from the bottom of the side member body 70. The leg is shown to have a slightly sloping back edge 80a and a generally vertical front edge 80b. A threaded shaft 82 extends forwardly form the front edge 80b of the leg 80 near the bottom of the leg. The shaft has a head 82a at the forward end thereof. The shaft 80 is threaded into a hole in the edge 80b or side member leg 80, such that the extent of the shaft protruding from the leg can be selectively adjusted. For reasons that will become more apparent below, the shaft 82 has a length that is than the width of the transverse member 32.

A heel 84 extends forwardly from the body 70 at the bottom of the body 70. An arm 86 extends downwardly from the back of the heel. The arm 86 is spaced forwardly of the front edge 80b of the leg 80, and the leg 80 and arm 86, in combination, define a bottom slot 88.

The roof member 36 is shown generally in FIGS. 7a-d. The roof member includes a back portion 90 having a back edge 91 and side edges 92. The side edges include a generally straight back portion 92a, which is generally perpendicular to the back edge 91, and a concave portion 92b. Elongate openings 94 are formed in the roof member 36 at the back corners of the roof member (i.e., near the junction of the back edge 91 and the side edges 92a). The elongate openings 94 are generally parallel to the side edges 92a, and are sized to receive the upper arms 74 of the side members 34. At its forward end, the roof member 36 slants downwardly to form a forward portion 96.

The components of the canopy (i.e., the transverse members 32, the side members 34 and the roof member 36) are all preferably molded from plastic. They can, for example, be rotomolded or injection molded. Further, the various components are all preferably formed to have the same width. The various slots in the components are all sized to have a width slightly greater that the width of the components, such that the slots can receive the components, as described below. If the components all have the same approximate width between their major surfaces, then the slots of the components can all generally be of the same width The canopy 30 is preferably assembled onto a tricycle (as opposed to be assembled first and then being mounted to the tricycle). However, if desired, the canopy 30 can be assembled first and then mounted to the tricycle. However, this second method will not be described. To assemble the canopy 30 on a tricycle, the bottom transverse member 32a is placed on the shoulders 20 of the tricycle, by placing the transverse member bracket 60 on the tricycle shoulder. The lower transverse member 32b, and hence the canopy, will be supported on the tricycle shoulder by the bracket. With the lower transverse member 32a on the tricycle shoulder, the leg 46 will be positioned behind the tricycle shoulder 20 and will extend below the tricycle shoulder. Hence, the slot 48 will be, at least in part, below the tricycle shoulder 20.

Figure 4D:
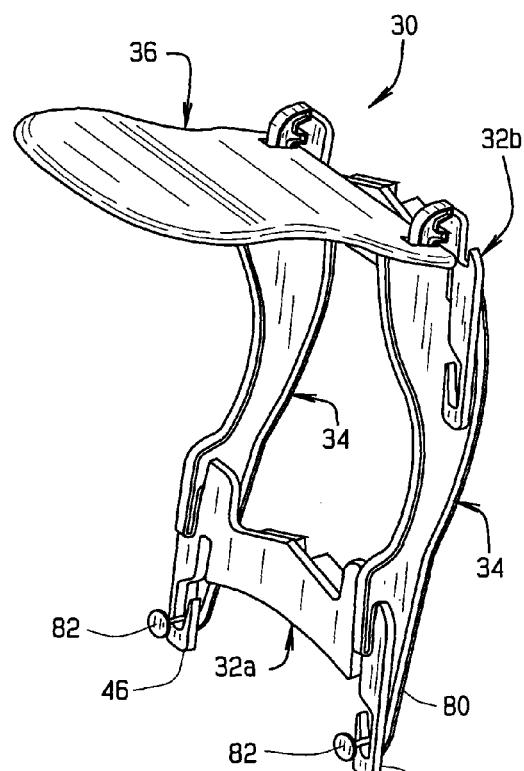
Figure 6A:
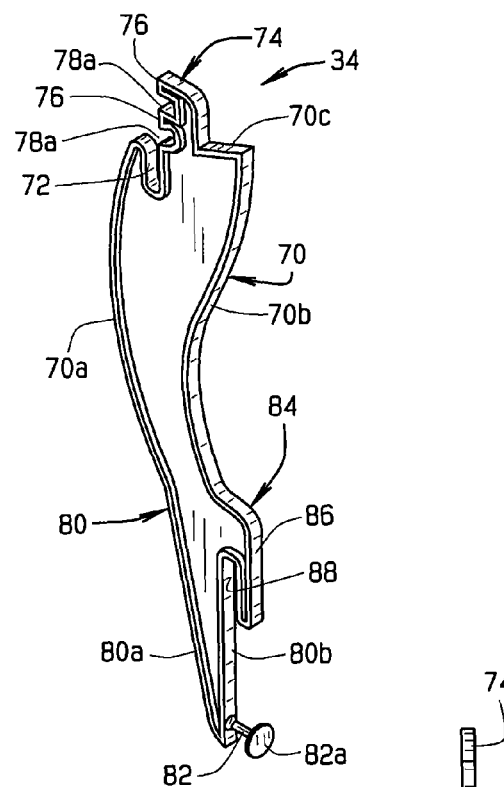
FIGS. 6a-d are perspective, front elevational, side elevational and top plan views of a side member of the canopy; the canopy employing two such side members.
Figure 6B:
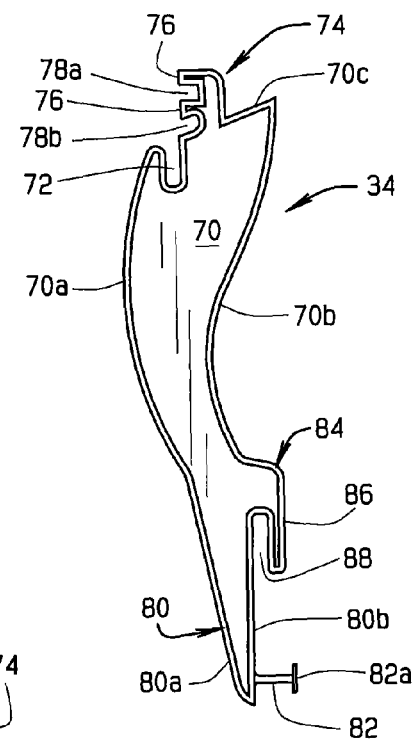
Figure 6C:
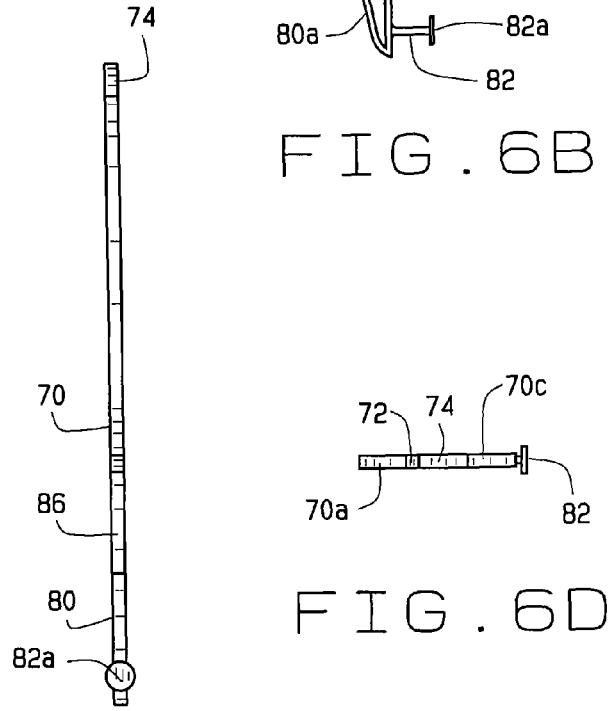
Figure 6D:
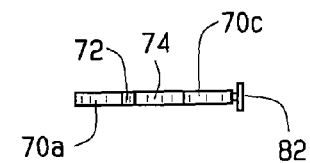
Figure 7A:
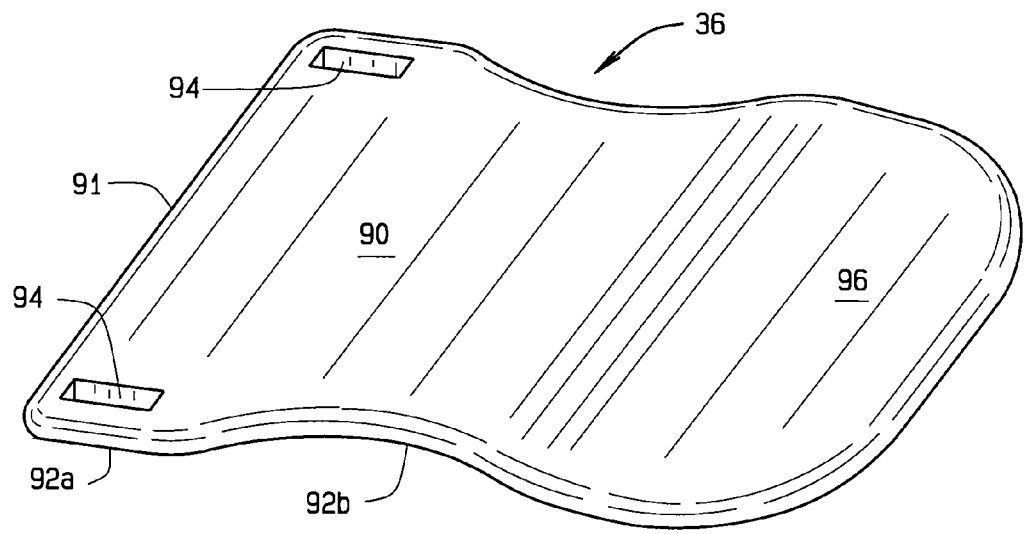
FIGS. 7a-d are perspective, top plan, side elevational and front elevational views of a roof member of the canopy.
Figure 7B:
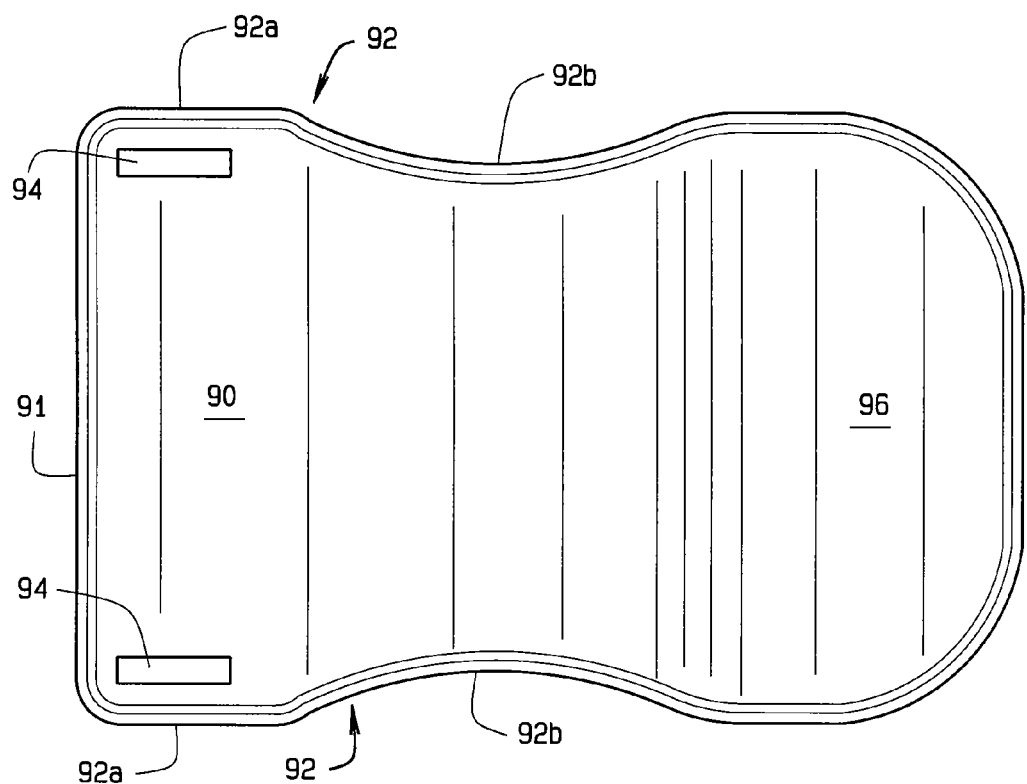
Figure 7C:
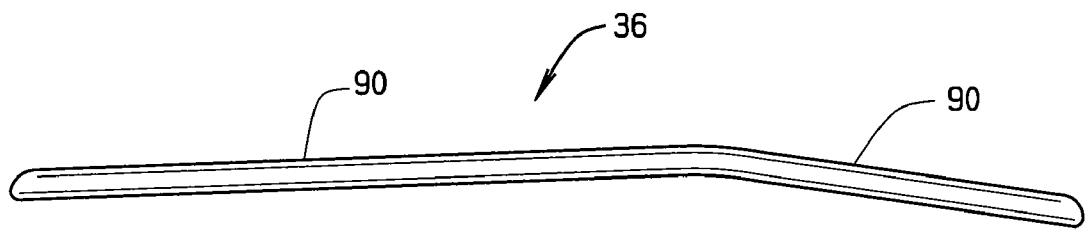
Figure 7D:
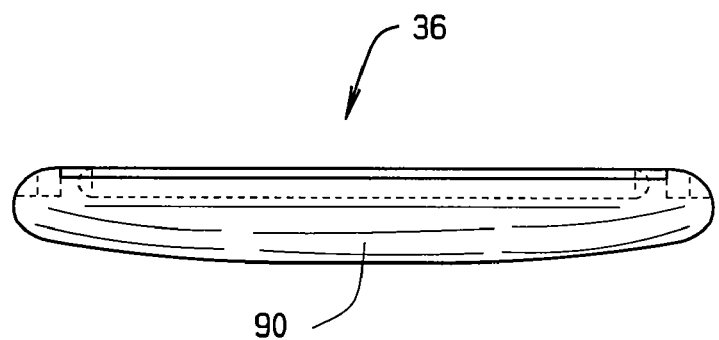

The side members 34 are next mounted to the lower transverse member 32a. To do so, the threaded shaft 82 at the bottom of each of the side member leg 80 is placed in the slot 48 of the transverse member leg 46. The shaft 82 extends forwardly through the leg slot 48 and is sufficiently long, such that the head 82a of the shaft 82 is on a side of transverse member leg 46 opposite the side member leg 80, as seen in FIG. 4d. In addition, the side member heel 84 is positioned above the lower transverse member 32a such that the slot 88 in the side member heel is above and aligned with the slots 58 in the transverse member 32a (which will be upwardly facing). With the side member 34 aligned with the transverse member 32a, the side member 34 is urged downwardly, such that the slot 88 of the side member will receive the transverse member 32a and the slot 58 of the transverse member 32a will receive the side member 34. The side member slot 88 and the transverse member slots 58 and 48 are sized, such that when the side member 34 is mounted in the transverse member, the ends of the side member slot 88 and the transverse member slot 58 are proximate each other, and preferably, engaging each other. Additionally, the shaft 82 in the side member leg 80 will extend through such that its head 82a is on a side of the transverse member opposite that of the side member 34. The shaft 82 can then be tightened, such that the shaft head 82a will bear down on the front surface of the transverse member leg 46, such that the transverse member leg will be sandwiched between the shaft head 82a and the leg 80 of the side member 34. With one side member in place, the second side member 34 can then be mounted to the transverse member 32a. When the side members 34 are positioned in the lower transverse member 32a, the side members' slots 72 face upwardly, and the fingers 76 (and hence the slots 78a,b) in the arm 74 face rearwardly.

After both side members 34 are mounted to the lower transverse member 32a, the cover or roof member 36 is mounted to the side members 34. To mount the roof member 36 to the side members, the openings 94 in the roof member 36 are aligned with the upwardly extending arms 74 of the side members 34 and the roof member 36 is slid down over the arms 74, so that the roof member 34 rests on the upper edge 70c of the side members 34. With the roof member resting on the upper edge of the side members, the roof member 36 is urged forwardly, such that the roof member is received in the lower slot 78b. When the roof member is received in the lower horizontal slots 78a of the side members, the back edge of the roof will be flush with, or spaced slightly forward of, the forward edge of the side member upper slot 72.

As best seen in FIG. 5b, the slots 58 in the edge 44 of the transverse member are offset from the vertical by an angle α such that the slots are directed slightly inwardly (i.e., towards the center of the transverse member 32). This angle α is about 3°-10°, and is preferably about 5°. The angle can be outside of this range as well. Hence, when the side members 34 are placed in the lower transverse member 32a, they will have a slight inward cant or slope. The openings 94 in the roof member 36 are positioned to reinforce this slope or cant such that there is a frictional engagement of the arms 74 of the side members 34 with the outer edges of the roof member openings 94. This pulls the upper ends of the side members 34 inwardly slightly, thereby creating a frictional engagement between the slots 58 and 88 of the transverse member 32a and side members 34, respectively, with the side members 34 and transverse member 32a, respectively. Thus, the inner surfaces of the side members will frictionally engage the edge 54c of the inner tooth 54 (which forms the inner edge of the slot 58)

The upper transverse member 32b now can be mounted to the side members 34. The upper transverse member 32b is mounted in the side members 34 by aligning the slots 50 in the transverse member edge 42 with the upwardly opening slots 72 in the side members. The upper transverse member 32b is then urged down, such that the upper transverse member slots 50 receive the side members 34, and the side member slots 72 receive the upper transverse member 32b. The peaked upper edge 44 of the transverse member 32b is sized such that the upper-most point of the edge 44 is at least flush with, and preferably higher than, back edge of the roof, when the roof 36 and upper transverse member 32b are mounted on the side members. Hence the upper transverse member prevents the roof member from moving relative to the side member arms, to effectively lock the roof member in place in the canopy.

As best seen in FIG. 5b, the slots 58 in the edge 42 of the transverse member 32 also are offset from the vertical by the same angle α such that the slots are directed slightly inwardly (i.e., towards the center of the transverse member 32). Additionally, the inner edge 46a of the transverse member leg is also offset from the vertical by this same angle α, such that the leg edge 46a is directed slightly inwardly. When the upper transverse member 32b is mounted to on the side members 34, the inner edge 46a of the legs will engage an outer surface of the side members 34 to urge the side members inwardly slightly. This engagement of the legs of the upper transverse member 32b reinforce the positioning of the upper ends of the side members by the cover 36. Hence, this will reinforce the frictional engagement of the side members 34 with the roof member 36 and lower transverse member 32a. It will also form a frictional engagement between the side members 34 and the upper transverse member 32b. This frictional engagement will "pull together" the transverse members 32a,b and the side members 34 such that the four components will not wobble substantially relative to the tricycle.

Removal of the canopy 30 from the tricycle is just as easy. The process begins by removing the upper transverse member 32b from the side members 34. The roof member can then be removed from the side members 34 and the side members can then be removed from the lower transverse member 32a. Finally, the lower transverse member 32a can be removed from the tricycle. Of course, the shafts 82 will need to be loosened prior to the side members 34 being removed from the lower transverse member 32a.

As can be appreciated, the canopy 30 can be mounted to, and removed from, a tricycle without the use of tools. Due to the frictional engagement of the components as caused by the slight cant in the various slots, the canopy 30 is sturdy when mounted to the tricycle, and the components will not move substantially relative to each other; nor will the canopy sway substantially relative to the tricycle.

As various changes could be made in the above constructions without departing from the scope of the invention as set forth in the claims below, it is intended that all matter contained in the above description or shown in the accompanying drawings shall be interpreted as illustrative and not in a limiting sense. For example, the brackets 60 could be replaced with any type of mounting mechanism that will mount the transverse member 32 to the tricycle shoulder 20 and support the canopy 30 on the tricycle shoulder. The upper and lower transverse members 32a,b are described to be identical to reduce the number of parts that need to be molded. However, the transverse members 32a,b need not be identical. This would allow for the bracket 60 to not be included in the upper transverse member 32b. The legs 46 of the lower transverse member 32a and the legs 80 of the side members 34 provide for the placement of the shaft 82 to provide for a further connection between the side members 34 and the lower transverse member 32a. The shaft 82 could be replaced with a different type of clamping, or even a different type of connection. For example, the leg 80 could be provided with a lower slot which would be below the slot 88, such that the two slots would then engage the leg slot 48 and the slot 58 of the transverse member. Alternatively, a clamping member could be provided that would be engage the lower transverse member and the side member in the proximity of the transverse edge 42. This could allow the lower transverse member to be made without the legs 46. Such a clamping member could comprise the threaded shaft 82 with the head 82a, which clamps down on the lower transverse member when tightened. Alternatively, the clamping member could comprise a spring biased clip which is mounted to one of the side member and the lower transverse member to clamp the other of the side member and the lower transverse member. Although the components of the canopy 30 are provided with mating slots (i.e., the slots 58 in the transverse member and the slots 88 in the side members), the upper and lower slots 72 and 88 of the side members 34 could be omitted. However, the slots 72 and 88 of the side members 34 prevents the side members from moving relative to the upper and lower transverse members 32a,b. Thus, if one (or both) of the slots 72 and 88 of the side members were omitted, a different means would need to be provided to prevent the side members 34 from moving relative to the upper and lower transverse members. For example, a pin could be provided which would through the side members (i.e., from the outer surface to the inner surface of the side members) and into the edge of the transverse member. Such a pin or shaft could be threaded, to provide a threaded connection between the side members and the transverse members.

The invention claimed is:

1. A canopy adapted to be removably mounted on a tricycle; the canopy comprising a lower transverse member; the lower transverse member comprising a body having a forward surface, a rear surface, an upper edge, a lower edge and side edges; said body defining a vertical central axis; and an attachment device extending forwardly from said body forward surface; said attachment device being adapted to mount said lower transverse member to a shoulder of a tricycle; and pair of spaced apart upwardly opening slots extending generally downwardly from said upper edge; said slots being spaced apart generally equidistantly from said central axis of said body;

a pair of side members; said side members comprising a body having an inner surface, an outer surface, a front edge, a back edge and a top edge; and an arm extending upwardly from said side member top edge; said side members being sized to be received in said upwardly opening slots of said lower transverse member;

an upper transverse member comprising a body having a forward surface, a rear surface, an upper edge, a lower edge, and side edges; a pair of spaced apart downwardly opening slots extending upwardly from said lower edge, said slots being approximately equidistant from a centerline of the upper transverse member body; and a pair of legs extending downwardly from said upper transverse member body; said legs having an inner edge and an outer edge; said inner edge of said legs being generally co-linear with an outer edge of said upwardly extending slots; said inner edge of said legs engaging an outer surface of said side members when said canopy is assembled;

a roof member mounted on said side members to extend forwardly of said side members; said roof member having a back edge, a front edge, side edges and a pair of openings proximate the back and side edges; said openings being sized to receive said upwardly extending arms of said side members and being positioned to be aligned with said upwardly extending arms of said side members when said side members are mounted in said lower transverse member;

said upwardly opening slots of said lower transverse member; said downwardly opening slots of said upper transverse member and said inner edge of said legs of said upper transverse member all being sloped inwardly and positioned, such that when said canopy is assembled, the side members will slope inwardly and will frictionally engage said inner edge of said legs of said upper transverse member, at least one edge of said upwardly opening slot of said lower transverse member and at least one edge of said downwardly opening slot of said upper transverse member.

2. The tricycle canopy of claim 1 wherein said slope of said upwardly opening slots of said lower transverse member, said slope of said downwardly opening slots of said upper transverse member and said slope of said inner edge of said legs of said upper transverse member are all substantially the same.

3. The tricycle canopy of claim 1 wherein the slope is about 5°.

4. The tricycle canopy of claim 1 wherein said upwardly extending arms of said side members each include a generally horizontally extending slot; said upper transverse member body being sized and shaped such that at least a portion of said upper edge is at least level with said slots of said arms of said side members when said upper transverse member is mounted in said side members; said upwardly extending arms of said side members being positioned such that when said roof member is received in said slots of said side member arms, said roof member is effectively sandwiched between said upper transverse member and said arms of said side members.

5. The tricycle canopy of claim 1 wherein said upwardly opening slots of said lower transverse member are each defined by an inner edge and an outer edge; said inner edge being longer than said outer edge.

6. The tricycle canopy of claim 1 including means for maintaining the position of said side members relative to said lower and upper transverse members.

7. The tricycle canopy of claim 1 wherein said means for maintaining comprises upper and lower slots in said side members; said lower slots being sized to receive said lower transverse member and said upper slots being sized to receive said upper transverse member.

8. The tricycle canopy of claim 1 wherein said upper slots of said side members mate with said downwardly opening slots of said upper transverse member and said lower slots of said side members mate with said upwardly opening slots of said lower transverse member.

9. The tricycle canopy of claim 1 wherein said lower transverse member includes a downwardly extending leg and said side members each include a downwardly extending leg; said side member legs being adjacent said lower transverse member legs in the canopy when assembled; said canopy further including a connector to positively connect said lower transverse member legs to said side member legs.

10. The tricycle canopy of claim 9 wherein said connector comprises a threaded shaft which extends through said transverse member leg and into said side member leg.

11. The tricycle canopy of claim 10 wherein said lower transverse member leg includes a slot through which said threaded shaft extends; said threaded shaft having a head at an end of said shaft; whereby, when said shaft is tightened, said lower transverse member leg is sandwiched between said shaft head and said side member leg.

12. The tricycle canopy of claim 1 wherein said upper edge of said side members slopes forwardly and upwardly, whereby said roof member will slope upwardly when said canopy is assembled.

13. The tricycle canopy of claim 1 wherein said attachment device comprises a bracket.

14. A canopy for a tricycle; the canopy comprising a lower transverse member; the lower transverse member comprising a body having a forward surface, a rear surface, an upper edge, a lower edge and side edges; said body defining a vertical central axis; and an attachment device extending forwardly from said body forward surface; said attachment device being adapted to mount said lower transverse member to a shoulder of a tricycle; and pair of spaced apart upwardly opening slots extending generally downwardly from said upper edge; said slots being spaced apart generally equidistantly from said central axis of said body;

a pair of side members; said side members comprising a body having an inner surface, an outer surface, a front edge, a back edge and a top edge; an upwardly opening upper slot extending downwardly from said side member top edge; a downwardly opening lower slot extending upwardly from a bottom of said side member body; and an arm extending upwardly from said side member top edge; said arm including a generally horizontally extending slot; said downwardly opening lower slot of said side member being sized to receive said lower transverse member and said upwardly opening slot of said lower transverse member being sized to receive said side member; said downwardly opening slot of said side member and said upwardly opening slot of said lower transverse member receiving each other;

an upper transverse member comprising a body having a forward surface, a rear surface, an upper edge, a lower edge, and side edges; a pair of spaced apart downwardly opening slots extending upwardly from said lower edge, said slots being approximately equidistant from a centerline of the upper transverse member body; and a pair of legs extending downwardly from said upper transverse member body; said legs having an inner edge and an outer edge; said inner edge of said legs being generally co-linear with an outer edge of said upwardly extending slots; said upwardly opening slot of said side member being sized to receive said upper transverse member and said downwardly opening slots of said upper transverse member being sized to receive said side member, said downwardly opening slots of said upper transverse member being positioned on said upper transverse member to be generally aligned with the upwardly opening slots of said side members when said side members are mounted in said lower transverse member such that said upwardly opening slot of said side member and said downwardly opening slot of said upper transverse member receiving each other; and said downwardly extending legs of said upper transverse member each having an inner edge which engages the outer surface of said side members when said canopy is assembled;

a roof member mounted on said side members to extend forwardly of said side members; said roof member having a back edge, a front edge, side edges and a pair of openings proximate the back and side edges; said openings being sized to receive said upwardly extending arms of said side members and being positioned to be aligned with said upwardly extending arms of said side members when said side members are mounted in said lower transverse member; said slots in said side member arms being sized to receive said roof member; whereby, when said roof member is received in said slots of said side member arms, said back edge of said roof member is forward of said upwardly opening slot of said side members; said upper transverse member body being sized and shaped such that at least a portion of said upper edge is at least flush with said roof member when said roof member and upper transverse member are mounted in said side members such that said roof member is effectively sandwiched between said upper transverse member and said arms of said side members.

15. The tricycle canopy of claim 14 wherein said attachment device comprises a bracket.

16. The tricycle canopy of claim 14 wherein said upwardly opening slots of said lower transverse member, said downwardly opening slots in said upper transverse member and said inner edge of said legs of said upper transverse member are all sloped inwardly towards the centers of said lower and upper transverse members, respectively, whereby, an upper portion of said slots and said inner edge of said leg are closer to said respective centers than lower portions of said slots and said inner edge of said legs; such that, when said side members are canted inwardly to form a frictional engagement between said side members and said lower and upper transverse members.

17. The tricycle canopy of claim 14 wherein said upper edge of said side members slopes forwardly and upwardly, whereby said roof member will slope upwardly when said canopy is assembled.

* * * * *